July 2, 1935.   U. MEININGHAUS   2,006,683
BLADE SEGMENTS FOR RADIAL FLOW MACHINES
Filed July 26, 1933
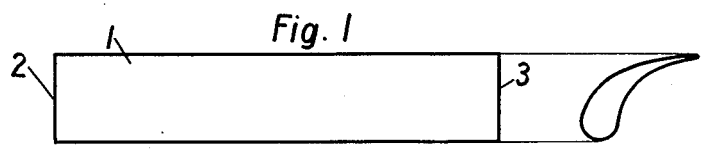
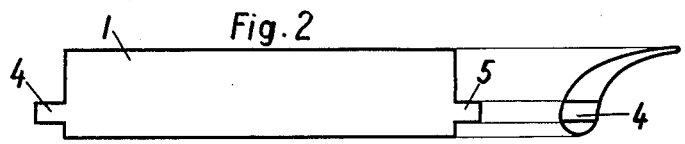
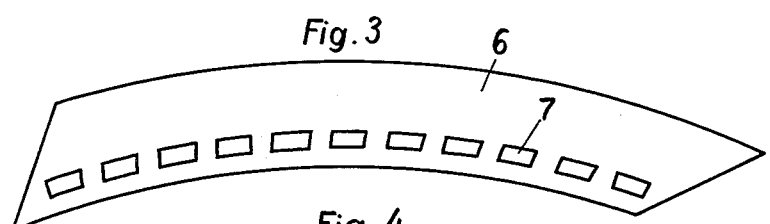
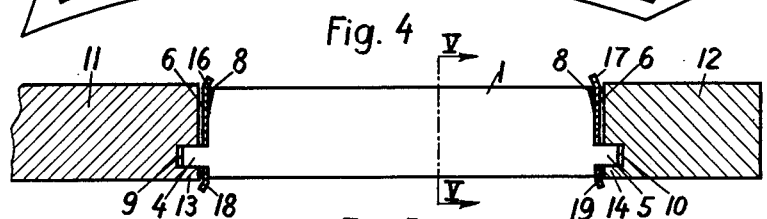
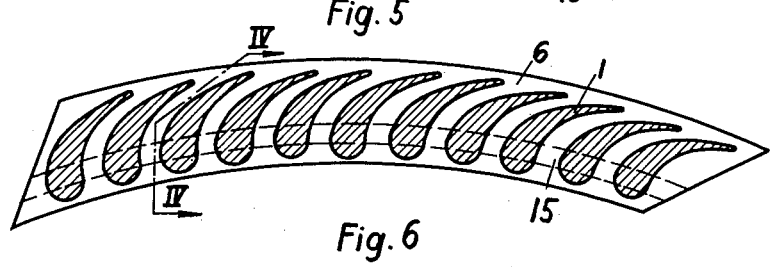
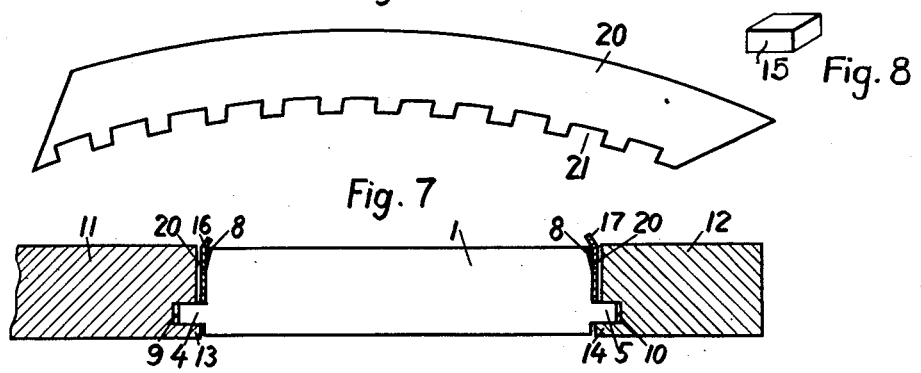
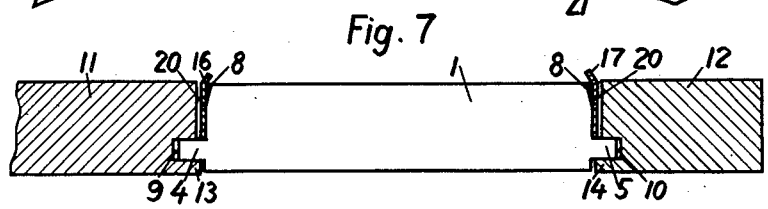
INVENTOR
Ulrich Meininghaus Patented July 2, 1935

2,006,683

UNITED STATES PATENT OFFICE 2,006,683

BLADE SEGMENTS FOR RADIAL FLOW MACHINES

Ulrich Meininghaus, Mulheim-Ruhr, Germany

Application July 26, 1933, Serial No. 682,177
In Germany October 31, 1932

7 Claims. (Cl. 253—16.5)

My invention relates to the fastening of blades in radially impinged machines, like steam or gas turbines, and aims at providing a cheap, but reliable and efficient arrangement.

Blades for radially impinged machines, in particular for turbines, are advantageously supported at both ends by carrier rings which are themselves closed. With such a two-sided support, the blade ends are stressed at the points of support by centrifugal force practically only by means of shearing stress, whilst the highest bending stress caused by the centrifugal force occurs in the middle of the blade. Comparatively simple connections between the blade ends and carrier rings are therefore sufficient. It is, however, important that the connection of the blade ends with the carrier rings increases the distance apart of the carrier rings as little as possible beyond the blade length determined by the conditions of flow, as the bending stress caused by the centrifugal force in the middle of the blade increases with the square of this distance.

A known solution for such blade connections, in which the blade ends are connected with special rings, e. g. by a welding operation and by rolling of special projections on these rings into grooves in the carrier rings, involves however the disadvantage of such an increase in the distance apart of the rings. It is, therefore, essential for constructions of this kind that the special rings to which the blade ends are connected by a welding operation are full rings themselves and are able to support the blade ends against the centrifugal force. But the manufacture of such closed additional rings is expensive. A further disadvantage of such construction results from the fact that closed rings offer a marked resistance against any tilting effect. If for instance the carrier rings at the one end of the blades are rigidly fastened to or integral with the disc which supports the blading these carrier rings expand under the action of the centrifugal force differently from the carrier rings at the other end of the blades which are entirely free to expand. Thus the blades assume a somewhat inclined position and exert a tilting effect on the rings holding the blade ends. Any resistance offered against such tilting effect by said rings results in bending stresses exerted on the blades. It has, therefore, already been proposed to hold together the blades in segments only and to make the connections of the ends of the blades so thin that the connecting portions can be entirely housed within grooves of the carrier rings. This method of construction is possible, since the blade ends are practically only submitted to shearing stress by centrifugal force, and it is found that there is sufficient strength of the projections after they are cut out of the blade material of corresponding small radial height, which engage in grooves in the carrier rings. The blades can hereby be manufactured of rolled sections corresponding to the blade profile or out of machined rods if the blade profile possesses projections of sufficient thickness, preferably near the entry end, so that there is no need to provide additional thickness for the projections. In a known construction of this kind, these projections cut out of the blade material are engaged with correspondingly toothed rods, welded, machined, and then rolled into corresponding grooves of the carrier rings.

As by the support by means of projections cut from the blade material, the latter must necessarily be formed from parts of the blade profile of greater thickness, the projections naturally are located at a considerable distance from the exit edges of the blades which must, as is known, be sharp for attaining a good efficiency. Therefore, the blade ends in the neighbourhood of the exit edges are not in rigid connection with the carrier rings. It is true that in the stationary condition of the blades the rigid attachment of the blade ends to the end surfaces of the carrier rings, even in the neighbourhood of the blade exit edges, can be obtained by a suitable rolling-in. In the operating condition, however, this tight attachment is often not preserved. A permanent or transient differential expansion of the carrier rings or bending of the blades give rise, for example, to an inclined position of the blade ends, which must lead to gaping of the blade ends relatively to the end surfaces of the carrier rings at the height of the blade exit edges, and actually does lead to this, as is shown by measurements at such blade rings tested. On the other hand, however, in radially impinged bladings the greatest differences of pressure occur in most cases just at the exit edges of the blades, so that by the gap caused by these blades considerable packing and flow losses rise.

This is where the present invention begins. It proposes that the blades at the entry side should be attached by projections near the blade entry edges, and at the exit side by a soldered or welded connection of the blade ends with the rods in their positions to each other. Conveniently, the projections—which are preferably submitted to no soldering or welding operation—extend beyond the rods and convey the centrifugal forces of the blading directly through the supporting carrier rings. The attachment in the grooves of the carrier rings is effected by rolling the projections extending from the rods—preferably, submitted to no soldering or welding operation—in grooves of the supporting carrier rings, preferably, filling up the spaces between the projections. It is an additional advantage of such arrangements that the projections, which must convey the high centrifugal force of the blades to the carrier rings, do not need to be submitted to any soldering or welding operation which would alter, by heating, the structure or the tensile properties of the material. On the basis of such an arrangement, it is, moreover, possible to manufacture the rods, which are unloaded from the centrifugal force of the blades, of strips of plate of less than 1 mm. in thickness. The flow and leakage losses which still occur along the exit ends of the carrier rings can, according to a further feature of the invention, be diminished by arranging that the rods or strips extend at least in one radial direction beyond the blade edges—preferably, the exit edges. To this end the strips are advantageously bent inwardly at the exit edges of the blades with a diminution of the exit width of the blade channels. This is favourable to an undisturbed outflow of driving medium from the blades. The same effect is obtained retrospectively when the strips are bent outwardly at the entry edges of the next blade ring with increase of the entry breadth of the blade channels.

Fig. 1 shows side views of blade pieces immediately after cutting off from a profile rod of the rolled section.

Fig. 2 is the same after cutting out the projections.

Fig. 3 is a side view of a prepared strip.

Fig. 4 is a section through a finished blade segment inserted in the carrier ring taken along the line IV—IV in Fig. 5.

Fig. 5 is a section through the middle of the blades along the line V—V in Fig. 4.

Figs. 6 and 7 show sections corresponding to Figs. 3 and 4 of a further example of construction.

Fig. 8 gives a view on a distance piece as used to fill out the spaces between the blade ends.

In known manner blade pieces corresponding to Fig. 1 are separated from a profile rod, e. g. sawn off. Projections 4 and 5 are formed at the blade ends 2 and 3 of such blade pieces, e. g. by a milling operation. At the same time sheet strips 6, in the form as shown in Fig. 3, are manufactured, holes 7 for the blade projections 4 and 5 being formed, e. g. by a stamping operation. The blade pieces 1 and strips 6 are now assembled according to Figs. 4 and 5 and the strips are rigidly connected at the points 8 by soldering or welding, preferably electric spot welding. The projections 4 and 5 of the blade pieces 1 which extend through the strips 6 can now be inserted into the grooves 9 and 10 of the carrier rings 11 and 12 and be rolled rigidly into connection with them by pressing on the thin extensions 13 and 14. A rigid soldering or welding of the projections 4 and 5 with the strips 6, which might weaken the material of the projections, is not necessary, but conveniently, the interspaces between the projections of adjacent blades are filled up by distance pieces 15 which may be loosely introduced.

Clearance losses by leakage of driving medium between the ends of the blade pieces 1 and the strips 6 are actually avoided in this way; as, however, clearance losses along the carrier rings also occur if the connections of the points 8 at the blade exit ends, are absolutely tight, the strips 6 are extended at 16 and 17 radially over the blade exit edges and, in order to guide the driving medium stream, are bent inwardly. A similar effect is obtained by extending the strips 6 at the entry edges of the next following blade row, whereby the strips are bent outwardly corresponding with the parts 18 and 19 of the blade row shown. The bending is facilitated by the fact that, according to the invention, very thin strips may be employed.

The figures naturally show examples only, to which the carrying out of the invention is in nowise bound. Fig. 6, for instance, shows a sehet strip 20 of smaller radial depth than the support according to Fig. 3, in which slots 21 only are provided for the reception of the projections 4 and 5. Fig. 7 is a corresponding view of the assembly of the blade ring.

I claim:

1. A blade segment suitable for use in a radial-flow machine comprising a plurality of blades, projections at the ends of said blades close to the entry edge of said blades and integral with said blades, carrier rings of curved shape arranged at each blade end supporting said blades, and strips arranged along said rods and provided with holes or notches to hold the entry edges of said blades in their position to each other by receiving said projections, said blades being soldered or welded to said strips close to the exit edges only.

2. A blade ring suitable for use in a radial-flow machine comprising a plurality of blades, projections at the ends of said blades close to the entry edge of said blades and integral with said blades, a plurality of strips forming parts of the circumference of said ring and provided with holes or notches to hold the entry edges of said blades in their position to each other by receiving said projections, and carrier rings arranged at each blade end and supporting said strips and said blades against the centrifugal force, said blades being soldered or welded to said strips close to the exit edges only.

3. A blade ring suitable for use in a radial-flow machine comprising a plurality of blades, projections at the ends of said blades close to the entry edge of said blades and integral with said blades, a plurality of strips forming parts of the circumference of said ring and provided with holes or notches to hold the entry edges of said blades in their position to each other by receiving said projections, and carrier rings arranged at each blade end and supporting said strips and said blades by holding said projections extending beyond said strips in suitable grooves, said blades being soldered or welded to said strips close to the exit edges only.

4. Apparatus according to claim 2, wherein said strips comprise sheet strips of less than $\frac{1}{16}$ inch in thickness.

5. Apparatus according to claim 2, wherein said strips extend in a radial direction beyond the blade edges.

6. Apparatus according to claim 2, wherein said strips at the exit edges of said blades extend beyond said edges and are bent inwardly and thus diminish the exit width of the blade channels.

7. Apparatus according to claim 2, wherein said strips at the entry edges of said blades extend beyond said edges and are bent outwardly and thus increase the entry width of the blade channels.

ULRICH MEININGHAUS.